US010077342B2

(12) United States Patent
An et al.

(10) Patent No.: US 10,077,342 B2
(45) Date of Patent: Sep. 18, 2018

(54) ELASTOMERIC COMPOSITIONS COMPRISING CELLULOSE ESTER ADDITIVES

(71) Applicant: Eastman Chemical Company, Kingsport, TN (US)

(72) Inventors: Haining An, Kingsport, TN (US); Pruthesh Hariharrao Vargantwar, Cary, NC (US); Bradley James Helmer, Kingsport, TN (US); Mark Arigo, Hudson, OH (US); Soumendra Kumar Basu, Copley, OH (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 15/409,644

(22) Filed: Jan. 19, 2017

(65) Prior Publication Data

US 2017/0210888 A1 Jul. 27, 2017

Related U.S. Application Data

(60) Provisional application No. 62/281,208, filed on Jan. 21, 2016.

(51) Int. Cl.
| | |
|---|---|
| *C08L 1/10* | (2006.01) |
| *C08J 3/22* | (2006.01) |
| *C08J 3/00* | (2006.01) |
| *C08L 7/00* | (2006.01) |
| *C08K 3/04* | (2006.01) |
| *C08L 61/12* | (2006.01) |

(52) U.S. Cl.
CPC .............. *C08J 3/22* (2013.01); *C08J 3/005* (2013.01); *C08K 3/04* (2013.01); *C08L 1/10* (2013.01); *C08L 7/00* (2013.01); *C08L 61/12* (2013.01); *C08J 2307/00* (2013.01); *C08J 2309/06* (2013.01); *C08J 2401/10* (2013.01); *C08J 2407/00* (2013.01); *C08J 2409/06* (2013.01); *C08L 2205/03* (2013.01)

(58) Field of Classification Search
CPC .............................. C08L 7/00; C08L 2205/03
USPC ........................................................ 524/37
See application file for complete search history.

(56) References Cited

U.S. PATENT DOCUMENTS

| | | |
|---|---|---|
| 1,683,347 A | 9/1928 | Gray et al. |
| 1,698,049 A | 1/1929 | Clarke et al. |
| 1,880,560 A | 10/1932 | Webber et al. |
| 1,880,808 A | 10/1932 | Clarke et al. |
| 1,973,398 A | 9/1934 | Trolander et al. |
| 1,984,147 A | 12/1934 | Malm |
| 2,076,781 A | 4/1937 | Jacobsen |
| 2,129,052 A | 9/1938 | Fordyce |
| 2,138,392 A | 11/1938 | Weingand |
| 3,220,865 A | 11/1965 | Coney |
| 3,462,328 A | 8/1969 | Buckland |
| 3,522,070 A | 7/1970 | Webb, Jr. |
| 3,617,201 A | 11/1971 | Berni et al. |
| 3,668,157 A | 6/1972 | Combs et al. |
| 3,878,137 A | 4/1975 | Hess et al. |
| 3,922,239 A | 11/1975 | Koleske et al. |
| 3,959,193 A | 5/1976 | Putman et al. |
| 4,007,144 A | 2/1977 | Sanders et al. |
| 4,009,030 A | 2/1977 | Abel |
| 4,092,455 A | 5/1978 | Pinto et al. |
| 4,094,695 A | 6/1978 | Sanders |
| 4,098,734 A | 7/1978 | Lee |
| 4,104,210 A | 8/1978 | Coran et al. |
| 4,111,535 A | 9/1978 | Loshaek et al. |
| 4,141,863 A | 2/1979 | Coran et al. |
| 4,147,603 A | 4/1979 | Pacifici et al. |
| 4,156,677 A | 5/1979 | Williams et al. |
| 4,166,809 A | 9/1979 | Brewer et al. |
| 4,243,769 A | 1/1981 | Pritchett |
| 4,250,939 A | 2/1981 | Shibata et al. |
| 4,269,629 A | 5/1981 | Zannucci |
| 4,285,381 A | 8/1981 | Furukawa et al. |
| 4,326,576 A | 4/1982 | Mizumoto et al. |
| 4,358,553 A | 11/1982 | Coran et al. |
| 4,436,853 A | 3/1984 | Schloman, Jr. |
| 4,443,595 A | 4/1984 | Namikoshi et al. |
| 4,499,043 A | 2/1985 | Yabe et al. |
| 4,506,045 A | 3/1985 | Waniczek et al. |
| 4,517,324 A | 5/1985 | Luhmann et al. |
| 4,604,425 A | 8/1986 | Ohmura et al. |
| 4,605,696 A | 8/1986 | Benko et al. |
| 4,758,645 A | 7/1988 | Miyazono et al. |
| 4,801,632 A | 1/1989 | Eichenauer et al. |
| 4,839,230 A | 6/1989 | Cook |
| 4,861,629 A | 8/1989 | Nahm |
| 4,889,481 A | 12/1989 | Morris et al. |
| 4,895,884 A | 1/1990 | Benko et al. |
| 4,926,920 A | 5/1990 | Gouttebessis et al. |
| 4,959,404 A | 9/1990 | Nakane et al. |
| 4,970,247 A | 11/1990 | Hoppe et al. |
| 4,983,730 A | 1/1991 | Domeshek et al. |
| 5,011,874 A | 4/1991 | Hoppe et al. |
| 5,030,692 A | 7/1991 | Durairaj |

(Continued)

FOREIGN PATENT DOCUMENTS

| | | |
|---|---|---|
| CN | 101186716 | 5/2008 |
| EP | 0236861 A2 | 2/1987 |

(Continued)

OTHER PUBLICATIONS

Kirk-Othmer, Encyclopedia of Chemical Technology, 5th Edition, vol. 5, Wiley-Interscience, New York (2004), pp. 394-444.

(Continued)

*Primary Examiner* — Hui H Chin
(74) *Attorney, Agent, or Firm* — Polly C. Owen

(57) ABSTRACT

An elastomeric composition is provided comprising at least one elastomer, at least one cellulose ester additive, at least one methylene acceptor, at least one methylene donor, and optionally, at least one filler; wherein the cellulose ester additive comprises at least one cellulose ester. The cellulose ester additive can also comprise at least one compatibilizer and/or plasticizer.

20 Claims, No Drawings

(56) References Cited

U.S. PATENT DOCUMENTS

| | | |
|---|---|---|
| 5,047,180 A | 9/1991 | Steiner et al. |
| 5,073,581 A | 12/1991 | Covelli et al. |
| 5,077,338 A | 12/1991 | Tung et al. |
| 5,082,914 A | 1/1992 | Cook et al. |
| 5,104,450 A | 4/1992 | Sand et al. |
| 5,166,233 A | 11/1992 | Kuroya et al. |
| 5,182,379 A | 1/1993 | Cook et al. |
| 5,194,513 A | 3/1993 | Wideman et al. |
| 5,206,289 A | 4/1993 | Sinsky et al. |
| 5,219,510 A | 6/1993 | Machell et al. |
| 5,244,725 A | 9/1993 | Dressler et al. |
| 5,256,453 A | 10/1993 | Heithorn et al. |
| 5,279,659 A | 1/1994 | Nishiura et al. |
| 5,281,647 A | 1/1994 | Eapen |
| 5,286,768 A | 2/1994 | Walker |
| 5,288,318 A | 2/1994 | Mayer et al. |
| 5,290,830 A | 3/1994 | Tung et al. |
| 5,292,783 A | 3/1994 | Buchanan et al. |
| 5,292,877 A | 3/1994 | Edgar et al. |
| 5,302,637 A | 4/1994 | Landry et al. |
| 5,374,671 A | 12/1994 | Corvasce et al. |
| 5,376,708 A | 12/1994 | Best et al. |
| 5,384,163 A | 1/1995 | Budde et al. |
| 5,393,333 A | 2/1995 | Trouve |
| 5,393,476 A | 2/1995 | Suzuki |
| 5,405,666 A | 4/1995 | Brindle |
| 5,405,897 A | 4/1995 | Segatta et al. |
| 5,441,998 A | 8/1995 | Teeters et al. |
| 5,446,079 A | 8/1995 | Buchanan et al. |
| 5,478,386 A | 12/1995 | Itoh et al. |
| 5,480,922 A | 1/1996 | Mulhaupt et al. |
| 5,504,127 A | 4/1996 | Wideman et al. |
| 5,536,778 A | 7/1996 | Kreckel et al. |
| 5,545,680 A | 8/1996 | Corvasce et al. |
| 5,559,171 A | 9/1996 | Buchanan et al. |
| 5,576,104 A | 11/1996 | Causa et al. |
| 5,580,911 A | 12/1996 | Buchanan et al. |
| 5,585,181 A | 12/1996 | Meraldi et al. |
| 5,587,238 A | 12/1996 | Meraldi et al. |
| 5,593,487 A | 1/1997 | Meraldi et al. |
| 5,594,068 A | 1/1997 | Buchanan et al. |
| 5,599,858 A | 2/1997 | Buchanan et al. |
| 5,609,677 A | 3/1997 | Itoh et al. |
| 5,624,975 A | 4/1997 | Valencia |
| 5,631,078 A | 5/1997 | Ellery et al. |
| 5,656,682 A | 8/1997 | Rimsa et al. |
| 5,663,310 A | 9/1997 | Shimoda et al. |
| 5,665,799 A | 9/1997 | Inui et al. |
| 5,672,639 A | 9/1997 | Corvasce et al. |
| 5,688,871 A | 11/1997 | Inui et al. |
| 5,698,612 A | 12/1997 | Simon et al. |
| 5,705,632 A | 1/1998 | Shimoda et al. |
| 5,707,737 A | 1/1998 | Mori et al. |
| 5,717,022 A | 2/1998 | Beckmann et al. |
| 5,720,803 A | 2/1998 | Itoh et al. |
| 5,720,804 A | 2/1998 | Martin |
| 5,723,151 A | 3/1998 | Cook et al. |
| 5,741,901 A | 4/1998 | Cook et al. |
| 5,750,677 A | 5/1998 | Edgar et al. |
| 5,753,140 A | 5/1998 | Shigemura |
| 5,766,752 A | 6/1998 | Cox et al. |
| 5,804,296 A | 9/1998 | Itoh et al. |
| 5,806,834 A | 9/1998 | Yoshida |
| 5,844,023 A | 12/1998 | Tomka |
| 5,856,468 A | 1/1999 | Shuto et al. |
| 5,871,573 A | 2/1999 | Cook et al. |
| 5,880,278 A | 3/1999 | Huston et al. |
| 5,910,544 A | 6/1999 | Ozawa et al. |
| 5,928,777 A | 7/1999 | Cox et al. |
| 5,936,056 A | 8/1999 | Durairaj et al. |
| 5,938,869 A | 8/1999 | Kaido et al. |
| 5,945,500 A | 8/1999 | Durairaj et al. |
| 5,973,139 A | 10/1999 | Lee et al. |
| 5,977,347 A | 11/1999 | Shuto et al. |
| 5,981,738 A | 11/1999 | Cook et al. |
| 6,001,484 A | 12/1999 | Horrion et al. |
| 6,010,595 A | 1/2000 | Mitchell et al. |
| 6,022,614 A | 2/2000 | Aubry et al. |
| 6,036,885 A | 3/2000 | Krutak et al. |
| 6,036,913 A | 3/2000 | Shibue et al. |
| 6,046,259 A | 4/2000 | Das et al. |
| 6,062,283 A | 5/2000 | Watanabe et al. |
| 6,063,842 A | 5/2000 | Kwon et al. |
| 6,079,465 A | 6/2000 | Takeyama et al. |
| 6,103,253 A | 8/2000 | Hoffmann et al. |
| 6,107,372 A | 8/2000 | Sakamaki |
| 6,133,439 A | 10/2000 | Buchanan et al. |
| 6,136,123 A | 10/2000 | Kaido et al. |
| 6,139,785 A | 10/2000 | Shuto et al. |
| 6,191,196 B1 | 2/2001 | Willett et al. |
| 6,202,726 B1 | 3/2001 | Corvasce et al. |
| 6,211,358 B1 | 4/2001 | Honda et al. |
| 6,214,907 B1 | 4/2001 | Tomka |
| 6,218,448 B1 | 4/2001 | Kraaijevanger et al. |
| 6,225,381 B1 | 5/2001 | Sharma et al. |
| 6,228,895 B1 | 5/2001 | Buchanan et al. |
| 6,232,285 B1 | 5/2001 | Casteel et al. |
| 6,258,799 B1 | 7/2001 | Kokubo et al. |
| 6,261,689 B1 | 7/2001 | Meraldi et al. |
| 6,269,858 B1 | 8/2001 | Sandstrom |
| 6,273,163 B1 | 8/2001 | Materne et al. |
| 6,274,653 B1 | 8/2001 | Hecht et al. |
| 6,313,202 B1 | 11/2001 | Buchanan et al. |
| 6,320,042 B1 | 11/2001 | Michihata et al. |
| 6,334,919 B1 | 1/2002 | Takeyama et al. |
| 6,345,656 B1 | 2/2002 | Corvasce et al. |
| 6,359,071 B1 | 3/2002 | Watanabe et al. |
| 6,362,256 B2 | 3/2002 | Willett et al. |
| 6,369,214 B1 | 4/2002 | Tye et al. |
| 6,382,285 B1 | 5/2002 | Mori et al. |
| 6,390,164 B1 | 5/2002 | Beers |
| 6,391,945 B2 | 5/2002 | Sanstrom |
| 6,397,912 B1 | 6/2002 | Watanabe et al. |
| 6,402,867 B1 | 6/2002 | Kaido et al. |
| 6,403,696 B1 | 6/2002 | Barber et al. |
| 6,427,736 B1 | 8/2002 | Meraldi et al. |
| 6,437,023 B1 | 8/2002 | Otaki et al. |
| 6,458,871 B2 | 10/2002 | Materne et al. |
| 6,468,609 B2 | 10/2002 | Marien et al. |
| 6,469,101 B2 | 10/2002 | Nahmias |
| 6,472,457 B1 | 10/2002 | Durairaj et al. |
| 6,484,773 B1 | 11/2002 | Bruant |
| 6,503,581 B1 | 1/2003 | Shibue et al. |
| 6,506,824 B1 | 1/2003 | Bastioli et al. |
| 6,539,996 B1 | 4/2003 | Corvasce et al. |
| 6,541,551 B1 | 4/2003 | Durairaj et al. |
| 6,548,578 B2 | 4/2003 | Pawlikowski |
| 6,550,508 B1 | 4/2003 | Yamaguchi |
| 6,555,678 B1 | 4/2003 | Allandrieu et al. |
| 6,562,938 B2 | 5/2003 | Haile et al. |
| 6,569,827 B2 | 5/2003 | Van Dijk et al. |
| 6,571,802 B1 | 6/2003 | Yamashita |
| 6,588,470 B2 | 7/2003 | Kanenari et al. |
| 6,600,034 B2 | 7/2003 | Sato et al. |
| 6,605,670 B1 | 8/2003 | Durairaj et al. |
| 6,617,383 B2 | 9/2003 | Ikawa et al. |
| 6,620,866 B1 | 9/2003 | Obrecht et al. |
| 6,646,066 B2 | 11/2003 | Hahn et al. |
| 6,656,983 B1 | 12/2003 | Mayer et al. |
| 6,683,174 B1 | 1/2004 | Ozaki et al. |
| 6,712,896 B2 | 3/2004 | Ono et al. |
| 6,730,374 B2 | 5/2004 | Gamble et al. |
| 6,731,357 B1 | 5/2004 | Tachibana et al. |
| 6,746,732 B2 | 6/2004 | Gamble et al. |
| 6,773,497 B2 | 8/2004 | Katai |
| 6,800,684 B2 | 10/2004 | Hayashi et al. |
| 6,814,914 B2 | 11/2004 | Tasaka et al. |
| 6,838,511 B2 | 1/2005 | Zanzig |
| 6,844,033 B2 | 1/2005 | Shimizu et al. |
| 6,848,487 B2 | 2/2005 | Weydert et al. |
| 6,872,674 B2 | 3/2005 | Williams et al. |
| 6,872,766 B2 | 3/2005 | Schunk et al. |
| 6,878,760 B2 | 4/2005 | Corvasce et al. |
| 6,881,457 B2 | 4/2005 | Tasaka et al. |

(56) References Cited

U.S. PATENT DOCUMENTS

| | | |
|---|---|---|
| 6,881,770 B2 | 4/2005 | Mizuno et al. |
| 6,897,303 B2 | 5/2005 | Yamada |
| 6,914,139 B2 | 7/2005 | Mukunoki et al. |
| 6,924,010 B2 | 8/2005 | Frederick et al. |
| 6,946,519 B2 | 9/2005 | Okubo et al. |
| 6,958,394 B2 | 10/2005 | Saito |
| 6,966,999 B2 | 11/2005 | Tsou et al. |
| 6,974,608 B2 | 12/2005 | Shimizu et al. |
| 6,977,275 B2 | 12/2005 | Buchanan et al. |
| 6,984,631 B2 | 1/2006 | Aranishi et al. |
| 6,984,730 B2 | 1/2006 | Yamada et al. |
| 7,019,130 B2 | 3/2006 | Ito |
| 7,026,470 B2 | 4/2006 | Obie |
| 7,038,744 B2 | 5/2006 | Kuzuhara et al. |
| 7,041,745 B2 | 5/2006 | Lin et al. |
| 7,060,333 B2 | 6/2006 | Takeuchi et al. |
| 7,078,078 B2 | 7/2006 | Ito |
| 7,083,752 B2 | 8/2006 | Bermel |
| 7,102,499 B2 | 9/2006 | Myatt |
| 7,105,212 B2 | 9/2006 | Ito |
| 7,105,213 B2 | 9/2006 | Tasaka et al. |
| 7,117,911 B2 | 10/2006 | Kanenari |
| 7,122,586 B2 | 10/2006 | Sandstrom et al. |
| 7,125,591 B2 | 10/2006 | Nakajima et al. |
| 7,125,918 B2 | 10/2006 | Shimizu et al. |
| 7,148,344 B2 | 12/2006 | Nakanishi et al. |
| 7,153,552 B2 | 12/2006 | Kubo et al. |
| 7,156,137 B2 | 1/2007 | Corvasce et al. |
| 7,163,975 B2 | 1/2007 | Zanzig et al. |
| 7,166,339 B1 | 1/2007 | Mori et al. |
| 7,166,665 B2 | 1/2007 | Galimberti et al. |
| 7,182,981 B1 | 2/2007 | Tachibana et al. |
| 7,184,112 B2 | 2/2007 | Kuzuhara et al. |
| 7,208,205 B2 | 4/2007 | Shibue et al. |
| 7,208,592 B2 | 4/2007 | Kawanishi et al. |
| 7,220,460 B2 | 5/2007 | Murakami et al. |
| 7,226,499 B2 | 6/2007 | Matsufuji et al. |
| 7,247,663 B2 | 7/2007 | Kikuchi et al. |
| 7,249,621 B2 | 7/2007 | Sanstrom |
| 7,250,201 B2 | 7/2007 | Yamazaki et al. |
| 7,252,864 B2 | 8/2007 | Nair et al. |
| 7,252,865 B2 | 8/2007 | Schunk et al. |
| 7,253,221 B2 | 8/2007 | Mohanty et al. |
| 7,273,894 B2 | 9/2007 | Shelby et al. |
| 7,276,546 B2 | 10/2007 | Buchanan et al. |
| 7,282,091 B2 | 10/2007 | Hashimoto |
| 7,306,832 B2 | 12/2007 | Tasaka et al. |
| 7,314,894 B2 | 1/2008 | Horiguchi |
| 7,323,530 B2 | 1/2008 | Okubo et al. |
| 7,347,947 B2 | 3/2008 | Nakamura et al. |
| 7,354,633 B2 | 4/2008 | Saito et al. |
| 7,378,468 B2 | 5/2008 | Lechtenboehmer |
| 7,393,579 B2 | 7/2008 | Bermel |
| 7,404,424 B2 | 7/2008 | Higuchi |
| 7,445,821 B2 | 11/2008 | Michihata |
| 7,459,212 B2 | 12/2008 | Yamakwa et al. |
| 7,462,306 B2 | 12/2008 | Fukagawa |
| 7,462,382 B2 | 12/2008 | Ito et al. |
| 7,466,377 B2 | 12/2008 | Umeda et al. |
| 7,468,153 B2 | 12/2008 | Weydert et al. |
| 7,470,385 B2 | 12/2008 | Yamada |
| 7,471,360 B2 | 12/2008 | Murakami et al. |
| 7,479,312 B2 | 1/2009 | Tamagawa et al. |
| 7,501,167 B2 | 3/2009 | Sugiyama |
| 7,504,139 B2 | 3/2009 | Kawanishi et al. |
| 7,528,181 B2 | 5/2009 | Bailey |
| 7,550,182 B2 | 6/2009 | Inagaki et al. |
| 7,559,986 B2 | 7/2009 | Takeuchi et al. |
| 7,569,259 B2 | 8/2009 | Okubo et al. |
| 7,569,261 B2 | 8/2009 | Sasada |
| 7,585,905 B2 | 9/2009 | Shelton et al. |
| 7,599,028 B2 | 10/2009 | Kuzuhara et al. |
| 7,604,852 B2 | 10/2009 | Oya |
| 7,611,760 B2 | 11/2009 | Hayashi et al. |
| 7,615,264 B2 | 11/2009 | Fukagawa et al. |
| 7,625,970 B2 | 12/2009 | Klinkenberg et al. |
| 7,635,506 B2 | 12/2009 | Takagi |
| 7,651,743 B2 | 1/2010 | Fukagawa et al. |
| 7,659,331 B2 | 2/2010 | Gibson et al. |
| 7,662,801 B2 | 2/2010 | Kumar et al. |
| 7,666,482 B2 | 2/2010 | Umeda et al. |
| 7,695,780 B2 | 4/2010 | Ohgaru et al. |
| 7,704,570 B2 | 4/2010 | Takebe et al. |
| 7,709,067 B2 | 5/2010 | Takagi et al. |
| 7,709,572 B2 | 5/2010 | Takebe et al. |
| 7,732,523 B2 | 6/2010 | Morimoto et al. |
| 7,799,873 B2 | 9/2010 | Soeda |
| 7,868,073 B2 | 1/2011 | Kameda |
| 7,897,662 B2 | 3/2011 | Jozef Klinkenberg et al. |
| 7,947,141 B2 | 5/2011 | Kameda |
| 8,003,725 B2 | 8/2011 | Chapman et al. |
| 8,021,730 B2 | 9/2011 | Tsou et al. |
| 8,022,136 B2 | 9/2011 | Yano et al. |
| 8,067,488 B2 | 11/2011 | Buchannan et al. |
| 8,092,627 B2 | 1/2012 | Hashimura et al. |
| 8,188,164 B2 | 5/2012 | Chen et al. |
| 8,201,603 B2 | 6/2012 | Matsuda et al. |
| 8,372,193 B2 | 2/2013 | Chen et al. |
| 8,444,757 B2 | 5/2013 | Yamada et al. |
| 8,552,105 B2 | 10/2013 | Peters |
| 8,597,421 B2 | 12/2013 | Harada et al. |
| 8,668,771 B2 | 3/2014 | Harada et al. |
| 8,672,011 B2 | 3/2014 | Miyazaki |
| 8,851,084 B2 | 10/2014 | Lemmouchi et al. |
| 8,946,334 B2 | 2/2015 | Mizuno et al. |
| 9,068,063 B2 | 6/2015 | Helmer et al. |
| 9,200,147 B2 | 12/2015 | Helmer et al. |
| 2002/0028857 A1 | 3/2002 | Holy |
| 2002/0086163 A1 | 7/2002 | Shimizu et al. |
| 2002/0132960 A1 | 9/2002 | Haile et al. |
| 2002/0156270 A1 | 10/2002 | Kazama et al. |
| 2002/0192397 A1 | 12/2002 | Tsujimoto |
| 2003/0092801 A1 | 5/2003 | Agostini et al. |
| 2004/0024093 A1 | 2/2004 | Weydert et al. |
| 2004/0116587 A1 | 6/2004 | Victor Thielen et al. |
| 2004/0174474 A1 | 9/2004 | Tachibana et al. |
| 2004/0180993 A1 | 9/2004 | Shelton et al. |
| 2004/0181009 A1 | 9/2004 | Shelton et al. |
| 2004/0182486 A1* | 9/2004 | Bernard .............. B60C 9/0042 152/209.12 |
| 2005/0056356 A1 | 3/2005 | Lechtenbohmer et al. |
| 2005/0192434 A1 | 9/2005 | Buchanan et al. |
| 2005/0234231 A1 | 10/2005 | Hashimoto et al. |
| 2006/0004192 A1 | 1/2006 | Oya et al. |
| 2006/0021688 A1* | 2/2006 | Sandstrom .............. B60C 1/00 152/209.4 |
| 2006/0058425 A1 | 3/2006 | Mohanty et al. |
| 2006/0068128 A1 | 3/2006 | Greener et al. |
| 2006/0069192 A1 | 3/2006 | Nakamura et al. |
| 2006/0106149 A1 | 5/2006 | Sandstrom et al. |
| 2006/0106164 A1 | 5/2006 | Suzuki |
| 2006/0142559 A1 | 6/2006 | Ozaki et al. |
| 2006/0188667 A1 | 8/2006 | Watanabe et al. |
| 2006/0222786 A1 | 10/2006 | Oya et al. |
| 2006/0286397 A1 | 12/2006 | McCreight et al. |
| 2007/0046872 A1 | 3/2007 | Tasaka |
| 2007/0048461 A1 | 3/2007 | Nakajima et al. |
| 2007/0048462 A1 | 3/2007 | Takebe et al. |
| 2007/0092663 A1 | 4/2007 | Murakami |
| 2007/0178252 A1 | 8/2007 | Tasaka et al. |
| 2007/0209744 A1 | 9/2007 | Matsumura |
| 2007/0211336 A1 | 9/2007 | Michihata |
| 2007/0241480 A1 | 10/2007 | Kanenari et al. |
| 2007/0247576 A1 | 10/2007 | Tamagawa et al. |
| 2007/0264446 A1 | 11/2007 | Otoshi et al. |
| 2007/0298194 A1 | 12/2007 | Fukagawa et al. |
| 2008/0032067 A1 | 2/2008 | Sakurazawa et al. |
| 2008/0085953 A1 | 4/2008 | Bhattacharya et al. |
| 2008/0093012 A1 | 4/2008 | Hashimura |
| 2008/0105213 A1 | 5/2008 | Chen |
| 2008/0122128 A1 | 5/2008 | Irie et al. |
| 2008/0139803 A1 | 6/2008 | Sasada |
| 2008/0173215 A1 | 7/2008 | Sakurazawa et al. |
| 2008/0182924 A1 | 7/2008 | Morimoto et al. |

(56) References Cited

U.S. PATENT DOCUMENTS

| | | |
|---|---|---|
| 2008/0213512 A1 | 9/2008 | Nakamura et al. |
| 2008/0214699 A1 | 9/2008 | Halahmi et al. |
| 2008/0226930 A1 | 9/2008 | Furuichi et al. |
| 2008/0261722 A1 | 10/2008 | Bulpett et al. |
| 2008/0280072 A1 | 11/2008 | Arai et al. |
| 2008/0314491 A1 | 12/2008 | Soeda et al. |
| 2008/0314492 A1 | 12/2008 | Tsou et al. |
| 2009/0038728 A1 | 2/2009 | Kanenari |
| 2009/0043088 A1 | 2/2009 | Shimamoto et al. |
| 2009/0050842 A1 | 2/2009 | Shelby et al. |
| 2009/0053496 A1 | 2/2009 | Arita et al. |
| 2009/0054638 A1 | 2/2009 | Shelby et al. |
| 2009/0057610 A1 | 3/2009 | Godfrey |
| 2009/0062413 A1 | 3/2009 | Adur et al. |
| 2009/0062431 A1 | 3/2009 | Nasr et al. |
| 2009/0068377 A1 | 3/2009 | Kuki |
| 2009/0074989 A1 | 3/2009 | Nakamura et al. |
| 2009/0082492 A1 | 3/2009 | Klinkenberg et al. |
| 2009/0082511 A1 | 3/2009 | Klinkenberg et al. |
| 2009/0084550 A1 | 4/2009 | Korte et al. |
| 2009/0092771 A1 | 4/2009 | Sasata et al. |
| 2009/0096962 A1 | 4/2009 | Shelton et al. |
| 2009/0114329 A1 | 5/2009 | Tomoi |
| 2009/0142515 A1 | 6/2009 | Nakamura et al. |
| 2009/0143502 A1 | 6/2009 | Obie |
| 2009/0151841 A1 | 6/2009 | Jones et al. |
| 2009/0151844 A1 | 6/2009 | Miyazaki |
| 2009/0169772 A1 | 7/2009 | Yamada et al. |
| 2009/0169775 A1 | 7/2009 | Mukunoki et al. |
| 2009/0174845 A1 | 7/2009 | Takagi |
| 2009/0181232 A1 | 7/2009 | Wang et al. |
| 2009/0185112 A1 | 7/2009 | Kawabe et al. |
| 2009/0203898 A1 | 8/2009 | Buchanan et al. |
| 2009/0203899 A1 | 8/2009 | Buchanan et al. |
| 2009/0203900 A1 | 8/2009 | Buchanan et al. |
| 2009/0207491 A1 | 8/2009 | Takebe et al. |
| 2009/0211683 A1 | 8/2009 | Takahashi |
| 2009/0218024 A1 | 9/2009 | Tsou et al. |
| 2009/0227782 A1 | 9/2009 | Fujita et al. |
| 2009/0230576 A1 | 9/2009 | Nagashima |
| 2009/0246416 A1 | 10/2009 | Kawabe et al. |
| 2009/0246674 A1 | 10/2009 | Carlini et al. |
| 2009/0247682 A1 | 10/2009 | Galimberti et al. |
| 2009/0251643 A1 | 10/2009 | Yamada et al. |
| 2009/0253871 A1 | 10/2009 | Flynn et al. |
| 2009/0283194 A1 | 11/2009 | Hashimoto et al. |
| 2009/0286095 A1 | 11/2009 | Shelton et al. |
| 2009/0306361 A1 | 12/2009 | Kawabe et al. |
| 2009/0317567 A1 | 12/2009 | Takeda et al. |
| 2010/0002297 A1 | 1/2010 | Shibuya |
| 2010/0018622 A1 | 1/2010 | Tanno et al. |
| 2010/0024941 A1 | 2/2010 | Hara et al. |
| 2010/0040806 A1 | 2/2010 | Suzuki et al. |
| 2010/0040854 A1 | 2/2010 | Takada et al. |
| 2010/0040889 A1 | 2/2010 | Harano et al. |
| 2010/0043937 A1 | 2/2010 | Matsunaga et al. |
| 2010/0047480 A1 | 2/2010 | Suzuki et al. |
| 2010/0050889 A1 | 3/2010 | Manzini et al. |
| 2010/0069535 A1 | 3/2010 | Suzuki et al. |
| 2010/0071823 A1 | 3/2010 | Tomoi |
| 2010/0079707 A1 | 4/2010 | Nakayama et al. |
| 2010/0089288 A1 | 4/2010 | Shelby et al. |
| 2010/0105830 A1 | 4/2010 | Kaneko |
| 2010/0108212 A1 | 5/2010 | Kameda et al. |
| 2010/0108221 A1 | 5/2010 | Shibata et al. |
| 2010/0147440 A1 | 6/2010 | Matsunaga |
| 2010/0154960 A1 | 6/2010 | Kishizoe |
| 2010/0178309 A1 | 7/2010 | Matsui et al. |
| 2010/0181003 A1 | 7/2010 | Inoue |
| 2010/0184885 A1 | 7/2010 | Kawamura et al. |
| 2010/0236695 A1 | 9/2010 | Lamontia et al. |
| 2010/0288410 A1 | 11/2010 | Mori |
| 2010/0317800 A1 | 12/2010 | Pille-Wolf et al. |
| 2010/0319829 A1 | 12/2010 | Hashimura et al. |
| 2011/0030868 A1 | 2/2011 | Hamanaka |
| 2011/0039976 A1 | 2/2011 | Vasseur |
| 2011/0039986 A1 | 2/2011 | Takada et al. |
| 2011/0041975 A1 | 2/2011 | Iizuka |
| 2011/0046272 A1 | 2/2011 | Smits et al. |
| 2011/0056603 A1 | 3/2011 | Koutoku et al. |
| 2011/0136939 A1 | 6/2011 | Lechtenboehmer et al. |
| 2011/0160354 A1 | 6/2011 | Kouno et al. |
| 2011/0198011 A1 | 8/2011 | Matsuda et al. |
| 2011/0319529 A1 | 12/2011 | Helmer et al. |
| 2011/0319530 A1 | 12/2011 | Helmer et al. |
| 2011/0319531 A1 | 12/2011 | Helmer et al. |
| 2013/0131221 A1* | 5/2013 | Basu ................ C08L 1/10 524/32 |
| 2013/0150484 A1 | 6/2013 | Basu et al. |
| 2013/0150492 A1 | 6/2013 | Shelby et al. |
| 2013/0150493 A1 | 6/2013 | Shelby et al. |
| 2013/0150494 A1 | 6/2013 | Basu et al. |
| 2013/0150495 A1 | 6/2013 | Shelby et al. |
| 2013/0150496 A1 | 6/2013 | Basu et al. |
| 2013/0150497 A1 | 6/2013 | Basu et al. |
| 2013/0150498 A1 | 6/2013 | Basu et al. |
| 2013/0150499 A1 | 6/2013 | Basu et al. |
| 2013/0150500 A1 | 6/2013 | Shelby et al. |
| 2013/0150501 A1 | 6/2013 | Basu et al. |
| 2013/0158163 A1 | 6/2013 | Yagi et al. |
| 2014/0272368 A1 | 9/2014 | Herod |
| 2015/0083297 A1* | 3/2015 | Inata ................ C08L 61/12 152/450 |
| 2017/0210861 A1 | 7/2017 | An et al. |

FOREIGN PATENT DOCUMENTS

| | | |
|---|---|---|
| EP | 0722980 A1 | 7/1996 |
| EP | 0995775 A1 | 4/2000 |
| EP | 1086830 B1 | 11/2004 |
| EP | 1514900 B1 | 12/2007 |
| EP | 1950053 A1 | 7/2008 |
| EP | 2039532 A1 | 3/2009 |
| EP | 2072574 A1 | 6/2009 |
| EP | 1075966 A1 | 2/2011 |
| EP | 2333008 A1 | 6/2011 |
| JP | 62-032137 | 2/1987 |
| JP | 63-189476 | 8/1988 |
| JP | H082597413217239 A | 10/1996 |
| JP | 2004131670 A | 4/2004 |
| JP | 2005053944 A | 3/2005 |
| JP | 2006111858 A | 4/2006 |
| JP | 2007-161943 | 6/2007 |
| JP | 2007224253 A | 9/2007 |
| JP | 2009096917 | 5/2009 |
| JP | 2009263417 A | 11/2009 |
| RU | 2 050 390 | 12/1995 |
| WO | WO 00/34383 A1 | 6/2000 |
| WO | WO 2005/108480 A1 | 11/2005 |
| WO | WO 2005/111184 A2 | 11/2005 |
| WO | WO 2009/029217 A1 | 3/2009 |
| WO | WO 2009/063694 | 5/2009 |
| WO | WO 2010/032551 A1 | 3/2010 |

OTHER PUBLICATIONS

ASTM D 5289.
ASTM D 1646.
ASTM D2240.
ASTM D412.
ASTM D624.
Notification of Transmittal of the International Search Report and the Written Opinion of the International Searching Authority; International Application No. PCT/US2017/014223 dated Mar. 31, 2017.
Gedon, Steven, et al.; "Cellulose Esters, Inorganic Esters," Kirk-Othmer Encyclopedia of Chemical Technology, 5$^{th}$ Edition, 2004, vol. 5, pp. 394-444.
Ghiya, et al., "Biodegradability of Cellulose Acetate Plasticized with Citrate Esters," Journal of Macromolecular Science, Part A, vol. 33, Issue 5, May 1996, pp. 627-638.

(56) References Cited

OTHER PUBLICATIONS

Angellier, H. et al., "Processing and Structural Properties of Waxy Maize Starch Nanocrystals Reinforced Natural Rubber," Macromolecules, 2005, pp. 3783-3792, vol. 38, American Chemical Society.

Angellier, H. et al. "Mechanical Properties of Waxy Maize Starch Nanocrystal Reinforced Natural Rubber," Macromolecules, 2005, pp. 9161-9170, vol. 38, American Chemical Society.

Angellier, H. et al., "Optimization of the Preparation of Aqueous Suspensions of Waxy Maize Starch Nanocrystals Using a Response Surface Methodology," Biomacromolecules, 2004, pp. 1545-1551, vol. 5, American Chemical Society.

Putaux, J. et al., "Platelet Nanocrystals Resulting from the Disruption of Waxy Maize Starch Granules by Acid Hydrolysis," Biomacromolecules, 2003, pp. 1198-1202, vol. 4, American Chemical Society.

Basu, S., "Cellulose Esters in Rubber II: Preparation of Sub-Micron Cellulose Ester Particles for Application as Fillers in Tire Treads," Eastman Chemical Company Technical Report 2009-07319, 2009.

Wu, Y. et al., "A Strategy to Prepare High Performance Starch/ rubber Composites: In Situ Modification During Latex Compounding Process," Carbohydrate Polymers, 2006, pp. 109-113, vol. 65, Elsevier Ltd.

Bai, W. et al., "Partial Replacement of Silica with Microcrystalline Cellulose in Rubber Composites," Composites: Part A, 2009, pp. 1597-1605, vol. 40, Elsevier Ltd.

Critical Surface Tension Parameters for Various Polymers. Accudynetests website. Dated 2009. Downloaded Nov. 28, 2012.

Nie, L., et al., "Grafting Cellulose Acetate with Styrene Maleic Anydride Random Copolymers for Improved Dimensional Stability of Cellulose Acetate", J. Applied Polymer Sci., 2003, 54, 601-617.

"Eastman Cellulose-based specialty polymers", Bulletin E-325G 6/09. [Downloaded from internet on Jan. 16, 2013. Website: http://web.archive.org/web/20110516033534/http://www.eastman.com/Literature_Center/E/E325.pdf] May 16, 2001 (May 16, 2001) p. 8, Table 1.

Bai, W. "New Application of Crystalline Cellulose in Rubber Composites", Nov. 3, 2009, A Dissertation submitted to Oregon State University, pp. 1-204, entire document. (Abstract).

Anneken, David J., et al.; "Fatty Acids"; Ullmann's Encyclopedia of Industrial Chemistry, vol. 14, pp. 73-116, Published online Dec. 15, 2006.

Reinecke Helmut, et al.; "Plasticizers"; Encyclopedia of Polymer Science and Technology; Copyright 2011, pp. 1-27.

Eastman Cellulose Acetate Butyrate (CAB-381-0.1); Product Data Sheet; http://ws.eastman.com/ProductCatalogApps/PageControllers/ProdDatasheet_PC.aspx?Product=71001226; Obtained on Jun. 10, 2014.

Kraemer, Elmer O.; "Molecular Weights of Celluloses"; Industrial and Engineering Chemistry, col. 30, No. 10, pp. 1200-1203, Oct. 1938.

Wohlfarth, CH.; "Vapor-liquid equilibrium data of cellulose acetate in pyridine"; Landolt-Bornstein—Group VIII Advanced Materials and Technologies 6D1 (polymer solutions) (2009).

\* cited by examiner

ELASTOMERIC COMPOSITIONS COMPRISING CELLULOSE ESTER ADDITIVES

Conventionally, in order to produce elastomeric compositions with increased stiffness and tear resistance, large quantities of additives such as fillers (e.g., carbon black, silica, and other minerals), sulfur and vulcanization accelerators have been incorporated. Phenolic resin is also widely used in order to further increase the stiffness of the rubber composition. These solutions can often bring additional problems like processability issues due to high viscosity, blooming of sulfur, safety hazards, and increased cost. For example, fillers can cause processing viscosity and hysteresis to increase, rolling resistance to increase, and higher heat built-up. The addition of sulfur can reduce scorch time and cause blooming. It has been found that phenolic resins are expensive and can cause safety hazards due to the release of formaldehyde, volatile side products, and ammonia gas plus can reduce the strength at break of elastomeric compositions.

There is a need in the industry to overcome these disadvantages by selecting an additive that improves processing of elastomeric compositions and yet increases stiffness and tear resistance.

The use of cellulose ester additives (CEA) in an elastomeric composition containing methylene acceptors and methylene donors is found to have improved stiffness, tear resistance, and better processability. In addition, stiffness can be improved by about 10% to about 50%, and tear resistance can be improved by about 30% to about 200% with better processability. In the meantime, other physical properties and performance are retained without significant deterioration. The CEA can be added in tire components where a methylene acceptor is used, for instance, in apex, tread, sidewall, bead, skim, carcass, sidewall insert compounds. The CEA can further be used in applications besides tires.

This invention relates generally to the dispersion of a cellulose ester additive (CEA) into elastomeric compositions containing a methylene acceptor and donor in order to improve the mechanical and physical properties of the elastomeric composition. It has been observed that CEA can provide a dual functionality when utilized in elastomeric compositions and their production. This technology can be used to produce tires with improved steerability/handling stability and tear resistance along with processability. The improvement in elastomeric composition rigidity/hardness/stiffness can result in a thinner tire component leading to material costs reduction, and lighter more fuel efficient tires. Further, the CEA can facilitate commonly known processing methodologies using internal mixers, extruders, calendars and mills used in making these components by positively affecting formulation viscosity, mixing time/quality and filler dispersion and thereby increasing productivity and reducing cost. These improved component properties can be further translated into new tire component designs. The invention is applicable, but not limited to, passenger (PCR), truck/bus (TBR), off-the-road (OTR), and aircraft tire applications. The CEA can further be used in applications besides tires.

SUMMARY OF THE INVENTION

In one embodiment of the invention, an elastomeric composition is provided comprising at least one elastomer, at least one cellulose ester additive, at least one methylene acceptor, at least one methylene donor, and optionally, at least one filler compound. In another embodiment of the invention, a process to produce an elastomeric composition is provided comprising mixing at least one elastomer, at least one cellulose ester additive, at least one methylene acceptor, at least one methylene donor, and optionally, at least one filler compound. In another embodiment of the invention, a tire comprising an elastomeric composition is provided, wherein the elastomeric composition comprises at least one elastomer, at least one cellulose ester additive, at least one methylene acceptor, at least one methylene donor, and optionally, at least one filler compound. In yet another embodiment of the invention, an article is provided comprising an elastomeric composition, wherein the elastomeric composition comprises at least one elastomer, at least one cellulose ester additive, at least one methylene acceptor, at least one methylene donor, and optionally, at least one filler compound.

DETAILED DESCRIPTION

In one embodiment of the invention, an elastomeric composition is provided comprising at least one elastomer, at least one cellulose ester additive, at least one methylene acceptor, at least one methylene donor, and optionally, at least one filler compound.

The term "elastomer," as used herein, can be used interchangeably with the term "rubber." Due to the wide applicability of the process described herein, the CEA can be employed with virtually any type of elastomer. For instance, the elastomers utilized in this invention can comprise a natural rubber, a modified natural rubber, a synthetic rubber, and mixtures thereof.

The elastomer of the invention may also include one or more rubbers including, but are not limited to, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, butyl rubber, halogenated butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof. Common diene rubbers that can be utilized are polymers based on conjugated dienes such as, but not limited to, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like.

In one embodiment of the invention, the elastomers are selected from the group consisting of natural rubber, cis-polyisoprene, polybutadiene (including high cis-polybutadiene), or styrene-butadiene copolymers, styrene-isoprene copolymers, isoprene-butadiene copolymers, styrene-isoprene-butadiene tripolymers and like. Moreover, mixtures of two or more elastomers from the aforementioned groups may be utilized in this invention.

In certain embodiments of the present invention, at least one of the elastomers is a non-polar elastomer. For example, a non-polar elastomer can comprise at least about 90, 95, 98, 99, or 99.9 weight percent of non-polar monomers. In one embodiment, the non-polar elastomer is primarily based on a hydrocarbon. Examples of non-polar elastomers include, but are not limited to, natural rubber, polybutadiene rubber, polyisoprene rubber, butyl rubber, styrene-butadiene rubber, polyolefins, ethylene propylene monomer rubber (EPM), ethylene propylene diene monomer (EPDM) rubber, and polynorbornene rubber. Examples of polyolefins include, but are not limited to, polybutylene, polyisobutylene, and ethylene propylene rubber. In another embodiment, the elastomer comprises a natural rubber, a styrene-butadiene rubber, and/or a polybutadiene rubber. Non-polar elastomers are often used in tire components.

In certain embodiments, the elastomer contains little or no nitrile groups. As used herein, the elastomer is considered a "non-nitrile" elastomer when nitrile monomers make up less than 10 weight percent of the elastomer. In one embodiment, the elastomer contains no nitrile groups.

The elastomeric composition of the present invention can comprise at least about 0.5, 1, 2, 3, 4, or 5 parts per hundred rubber ("phr") of at least one cellulose ester additive, based on the total weight of the elastomers. Additionally or alternatively, the elastomeric composition of the present invention can comprise not more than about 75, 50, 40, 30, 20, 15, 10, or 8 phr of at least one cellulose ester additive, based on the total weight of the elastomers. The term "phr," as used herein, refers to parts of a respective material per 100 parts by weight of rubber or elastomer. In other embodiments of the invention, the amount of cellulose ester additive in the elastomeric composition can range from about 0.5 to about 40 phr, from about 0.5 to about 20 phr, about 0.5 to about 15 phr, about 1 to about 10, and about 1 to about 8.

The term "cellulose ester" or "cellulose ester additive" can be used interchangeably to mean a cellulose ester or a modified cellulose ester. In one embodiment of the invention, a modified cellulose ester comprises at least one cellulose ester and at least one plasticizer. In another embodiment, a modified cellulose ester comprises at least one cellulose ester and at least one compatibilizer. In yet another embodiment of the invention, a modified cellulose ester comprises at least one cellulose ester, at least one plasticizer, and at least one compatibilizer.

The cellulose esters useful in the present invention can be prepared using techniques known in the art or can be commercially obtained, e.g., from Eastman Chemical Company, Kingsport, Tenn., U.S.A.

The cellulose esters of the present invention generally comprise repeating units of the structure:

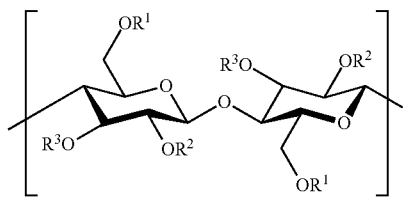

wherein $R^1$, $R^2$, and $R^3$ may be selected independently from the group consisting of hydrogen or a straight chain alkanoyl having from 2 to 10 carbon atoms, wherein at least 5% of R groups are 3-10 carbon atoms. In other embodiments of the invention, at least 10%, at least 20% and at least 30% of the R groups of the cellulose esters have 3-10 carbon atoms. Cellulose esters of this invention do not include cellulose acetate. For cellulose esters, the substitution level is usually expressed in terms of degree of substitution ("DS"), which is the average number of substitutents per anhydroglucose unit ("AGU"). Generally, conventional cellulose contains three hydroxyl groups per AGU that can be substituted; therefore, the DS can have a value between zero and three. Alternatively, lower molecular weight cellulose mixed esters can have a total degree of substitution ranging from about 3.08 to about 3.5. Generally, cellulose is a large polysaccharide with a degree of polymerization from 700 to 2,000 and a maximum DS of 3.0. However, as the degree of polymerization is lowered, as in low molecular weight cellulose mixed esters, the end groups of the polysaccharide backbone become relatively more significant, thereby resulting in a DS ranging from about 3.08 to about 3.5.

Because DS is a statistical mean value, a value of 1 does not assure that every AGU has a single substituent. In some cases, there can be unsubstituted AGUs, some with two substitutents, and some with three substitutents. The "total DS" is defined as the average number of substitutents per AGU. In one embodiment of the invention, the cellulose esters can have a total DS per AGU (DS/AGU) of at least about 0.5, 0.8, 1.2, 1.5, or 1.7. Additionally or alternatively, the cellulose esters can have a total DS/AGU of not more than about 3.0, 2.9, 2.8, or 2.7. The DS/AGU can also refer to a particular substituent, such as, for example, hydroxyl, acetyl, butyryl, or propionyl. For instance, a cellulose acetate propionate ("CAP") and cellulose acetate butyrate ("CAB") can have a total DS/AGU of about 1.7 to about 2.8.

The cellulose ester can be a cellulose triester or a secondary cellulose ester. Examples of cellulose triesters include, but are not limited to, cellulose tripropionate, or cellulose tributyrate. Examples of secondary cellulose esters include cellulose acetate propionate, and cellulose acetate butyrate. These cellulose esters are described in U.S. Pat. Nos. 1,698,049; 1,683,347; 1,880,808; 1,880,560; 1,984,147, 2,129,052; and 3,617,201, which are incorporated herein by reference in their entirety to the extent they do not contradict the statements herein.

In one embodiment of the invention, the cellulose ester is selected from the group consisting of cellulose acetate propionate, cellulose acetate butyrate, cellulose tripropionate, cellulose tributyrate, and mixtures thereof.

The degree of polymerization ("DP") as used herein refers to the number of AGUs per molecule of cellulose ester. In one embodiment of the invention, the cellulose esters can have a DP of at least about 2, 10, 50, or 100. Additionally or alternatively, the cellulose esters can have a DP of not more than about 10,000, 8,000, 6,000, or 5,000.

In certain embodiments, the cellulose esters can have an inherent viscosity ("IV") of at least about 0.2, 0.4, 0.6, 0.8, or 1.0 deciliters/gram as measured at a temperature of 25° C. for a 0.25 gram sample in 100 ml of a 60/40 by weight solution of phenol/tetrachloroethane. Additionally or alternatively, the cellulose esters can have an IV of not more than about 3.0, 2.5, 2.0, or 1.5 deciliters/gram as measured at a temperature of 25° C. for a 0.25 gram sample in 100 ml of a 60/40 by weight solution of phenol/tetrachloroethane.

In certain embodiments, the cellulose esters can have a falling ball viscosity of at least about 0.005, 0.01, 0.05, 0.1, 0.5, 1, or 5 pascals-second ("Pa·s"). Additionally or alternatively, the cellulose esters can have a falling ball viscosity of not more than about 50, 45, 40, 35, 30, 25, 20, or 10 Pa·s.

In certain embodiments, the cellulose esters can have a hydroxyl content of at least about 1.2, 1.4, 1.6, 1.8, or 2.0 weight percent.

In certain embodiments, the cellulose esters useful in the present invention can have a weight average molecular weight (Mw) of at least about 5,000, 10,000, 15,000, or 20,000 as measured by gel permeation chromatography ("GPC"). Additionally or alternatively, the cellulose esters useful in the present invention can have a weight average molecular weight (Mw) of not more than about 400,000, 300,000, 250,000, 100,000, or 80,000 as measured by GPC. In another embodiment, the cellulose esters useful in the present invention can have a number average molecular weight ($M_n$) of at least about 2,000, 4,000, 6,000, or 8,000 as measured by GPC. Additionally or alternatively, the cellulose esters useful in the present invention can have a number average molecular weight ($M_n$) of not more than about 100,000, 80,000, 60,000, or 40,000 as measured by GPC.

In certain embodiments, the cellulose esters can have a glass transition temperature ("Tg") of at least about 50° C., 55° C., 60° C., 65° C., 70° C., 75° C., or 80° C. Additionally or alternatively, the cellulose esters can have a Tg of not more than about 170° C., 160° C., 150° C., 140° C., or 130° C. In contrast, cellulose acetate is not utilized in this invention since it has a Tg of between 180-190° C. and has been found not to disperse well in elastomeric formulations.

In one embodiment of the present invention, the cellulose esters utilized in the elastomeric composition compositions have not previously been subjected to fibrillation or any other fiber-producing process. In such an embodiment, the cellulose esters are not in the form of fibrils and can be referred to as "non-fibril."

The cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and from sources such as, for example, cotton linters, softwood pulp, hardwood pulp, corn fiber and other agricultural sources, and bacterial celluloses.

One method of producing cellulose esters is by esterification. In such a method, the cellulose is mixed with the appropriate organic acids, acid anhydrides, and catalysts and then converted to a cellulose triester. Ester hydrolysis is then performed by adding a water-acid mixture to the cellulose triester, which can be filtered to remove any gel particles or fibers. Water is added to the mixture to precipitate out the cellulose ester. The cellulose ester can be washed with water to remove reaction by-products followed by dewatering and drying.

The cellulose triesters that are hydrolyzed can have three substitutents selected independently from alkanoyls having from 2 to 10 carbon atoms. Examples of cellulose triesters include cellulose tripropionate, and cellulose tributyrate or mixed triesters of cellulose such as cellulose acetate propionate and cellulose acetate butyrate. These cellulose triesters can be prepared by a number of methods known to those skilled in the art. For example, cellulose triesters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

After esterification of the cellulose to the triester, part of the acyl substitutents can be removed by hydrolysis or by alcoholysis to give a secondary cellulose ester. Secondary cellulose esters can also be prepared directly with no hydrolysis by using a limiting amount of acylating reagent. This process is particularly useful when the reaction is conducted in a solvent that will dissolve cellulose.

In another embodiment of the invention, low molecular weight mixed cellulose esters can be utilized, such as those disclosed in U.S. Pat. No. 7,585,905, which is incorporated herein by reference to the extent it does not contradict the statements herein.

In one embodiment of the invention, a low molecular weight mixed cellulose ester is utilized that has the following properties: (A) a total DS/AGU of from about 3.08 to about 3.50 with the following substitutions: a DS/AGU of hydroxyl of not more than about 0.70, a DS/AGU of C3/C4 esters from about 0.80 to about 1.40, and a DS/AGU of acetyl of from about 1.20 to about 2.34; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In another embodiment of the invention, a low molecular weight mixed cellulose ester is utilized that has the following properties: a total DS/AGU of from about 3.08 to 3.50 with the following substitutions: a DS/AGU of hydroxyl of not more than about 0.70; a DS/AGU of C3/C4 esters from about 1.40 to about 2.45, and DS/AGU of acetyl of from about 0.20 to about 0.80; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In yet another embodiment of the invention, a low molecular weight mixed cellulose ester is utilized that has the following properties: a total DS/AGU of from about 3.08 to about 3.50 with the following substitutions: a DS/AGU of hydroxyl of not more than about 0.70; a DS/AGU of C3/C4 esters from about 2.11 to about 2.91, and a DS/AGU of acetyl of from about 0.10 to about 0.50; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

The cellulose ester additive can be modified by the addition of a plasticizer and/or compatibilizer. The plasticizer utilized in this invention can be any that is known in the art that can reduce the melt temperature and/or the melt viscosity of the cellulose ester. The plasticizer can be either monomeric or polymeric in structure. In one embodiment, the plasticizer is at least one selected from the group consisting of a phosphate plasticizer, benzoate plasticizer, adipate plasticizer, a phthalate plasticizer, a glycolic acid ester, a citric acid ester plasticizer and a hydroxyl-functional plasticizer.

In one embodiment of the invention, the plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

In another embodiment of the invention, the plasticizer can be one or more esters comprising: (i) at least one acid residue including residues of phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In another embodiment of the invention, the plasticizer can be selected from at least one of the following: esters comprising: (i) at least one acid residue selected from the group consisting of phthalic acid, adipic acid, trimellitic acid, succinic acid, benzoic acid, azelaic acid, terephthalic acid, isophthalic acid, butyric acid, glutaric acid, citric acid and phosphoric acid; and (ii) at least one alcohol residue selected from the group consisting of aliphatic, cycloaliphatic, and aromatic alcohol containing up to about 20 carbon atoms.

In another embodiment of the invention, the plasticizer can comprise alcohol residues where the alcohol residues is at least one selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In another embodiment of the invention, the plasticizer can be selected from at least one of the following: aliphatic polyesters comprising $C_{2-10}$ diacid residues, for example, malonic acid, succinic acid, glutaric acid, adipic acid, pimelic acid, suberic acid, azelaic acid, and sebacic acid; and $C_{2-10}$ diol residues.

In another embodiment, the plasticizer can comprise diol residues which can be residues of at least one of the following $C_2$-$C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2000.

In another embodiment of the invention, the plasticizer comprises at least one of the following: Resoflex® R296 plasticizer, Resoflex® 804 plastocizer, SHP (sorbitol hexapropionate), XPP (xylitol pentapropionate), XPA (xylitol pentaacetate), GPP (glucose pentaacetate), GPA (glucose pentapropionate) and APP (arabitol pentapropionate).

In another embodiment of the invention, the plasticizer comprises one or more of: A) from about 5 to about 95 weight % of a $C_2$-$C_{12}$ carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a $C_5$ or $C_6$ carbohydrate. In one embodiment, the polyol ester does not comprise or contain a polyol acetate or polyol acetates.

In another embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In another embodiment of the invention, the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment, the plasticizer comprises at least one carbohydrate ester and the carbohydrate portion of the carbohydrate ester comprises an α-anomer, a β-anomer or a mixture thereof.

In another embodiment of the invention, the plasticizer can be a solid, non-crystalline resin. These resins can contain some amount of aromatic or polar functionality and can lower the melt viscosity of the cellulose esters. In one embodiment of the invention, the plasticizer can be a solid, non-crystalline compound (resin), such as, for example, rosin; hydrogenated rosin; stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

The amount of plasticizer in the cellulose ester additive can range from about 1 to about 50 weight percent based on the weight of the cellulose ester. Other ranges can be from about 5 to about 35 weight percent based on the weight of the cellulose ester, from about 5 to about 30, and from about 10 to about 20.

The compatibilizer can be either a non-reactive compatibilizer or a reactive compatibilizer. The compatibilizer can enhance the ability of the cellulose ester to reach a desired small particle size to improve the dispersion of the cellulose ester into an elastomer. The compatibilizers used can also improve mechanical and physical properties of the elastomeric composition compositions by improving the interfacial interaction/bonding between the cellulose ester and the elastomer.

When non-reactive compatibilizers are utilized, the compatibilizer contains a first segment that is compatible with the cellulose ester and a second segment that is compatible with a nonpolar elastomer. The first segment contains polar functional groups, which provide compatibility with the cellulose ester, including, but not limited to, such polar functional groups as ethers, esters, amides, alcohols, amines, ketones and acetals. The first segment may consist of oligomers or polymers of the following: cellulose esters; cellulose ethers; polyoxyalkylene, such as, polyoxyethylene, polyoxypropylene, polyoxybutylene; polyglycols, such as, polyethylene glycol, polypropylene glycol, polybutylene glycol; polyesters, such as, polycaprolactone, polylactic acid, aliphatic polyesters, aliphatic-aromatic copolyesters; polyacrylates and polymethacrylates; polyacetals; polyvinylpyrrolidone; polyvinyl acetate; and polyvinyl alcohol. In one embodiment, the first segment is polyoxyethylene or polyvinyl alcohol.

The second segment is compatible with the nonpolar elastomer and contains nonpolar groups. The second segment can be either saturated or unsaturated hydrocarbon groups or contain both saturated and unsaturated hydrocarbon groups. The second segment can be an oligomer or a polymer. In one embodiment of the invention, the second segment of the non-reactive compatibilizer is selected from the group consisting of polyolefins, polydienes, polyaromatics, and copolymers. An example of a polyaromatic second segment is polystyrene. An example of a copolymer second segment is styrene/butadiene copolymer.

In one embodiment, the first and second segments of the non-reactive compatibilizers can be in a diblock, triblock, branched or comb structure. The molecular weight of the non-reactive compatibilizers can range from about 300 to about 20,000 or from about 500 to about 10,000 or from about 1,000 to about 5,000. The segment ratio of the non-reactive compatibilizers can range from about 15 to about 85% polar first segments to about 15 to about 85% nonpolar second segments.

Examples of non-reactive compatibilizers include, but are not limited to, ethoxylated alcohols, ethoxylated alkylphenols, ethoxylated fatty acids, block polymers of propylene oxide and ethylene oxide, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy) ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive compatibilizers can be synthesized in situ in the cellulose ester composition or the elastomeric composition composition by reacting cellulose ester-compatible compounds with elastomer-compatible compounds. These compounds can be, for example, telechelic oligomers, which are defined as prepolymers capable of entering into further polymerization or other reaction through their reactive end groups. In one embodiment of the invention, these in situ compatibilizers can have higher molecular weight from about 10,000 to about 1,000,000.

In another embodiment of the invention, the compatibilizer can be reactive. The reactive compatibilizer comprises a polymer or oligomer compatible with one component of the composition and functionality capable of reacting with another component of the composition. There are two types of reactive compatibilizers. The first reactive compatibilizer has a hydrocarbon chain that is compatible with a nonpolar elastomer and also has functionality capable of reacting with the cellulose ester. Such functional groups include, but are not limited to, carboxylic acids, anhydrides, acid chlorides, epoxides, and isocyanates. Specific examples of this type of reactive compatibilizer include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive compatibilizers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

The second type of reactive compatibilizer has a polar chain that is compatible with the cellulose ester and also has functionality capable of reacting with a nonpolar elastomer. Examples of these types of reactive compatibilizers include cellulose esters or polyethylene glycols with olefin or thiol functionality. Reactive polyethylene glycol compatibilizers with olefin functionality include, but are not limited to, polyethylene glycol allyl ether and polyethylene glycol acrylate. An example of a reactive polyethylene glycol compatibilizer with thiol functionality includes polyethylene glycol thiol. An example of a reactive cellulose ester compatibilizer includes mercaptoacetate cellulose ester.

The amount of compatibilizer in the cellulose ester additive can range from about 1 wt % to about 40 wt %, from about 5 wt % to about 20 wt %, or about 10 to about 20 wt % based on the weight of the cellulose ester additive.

Methylene acceptor resins can be any that is known in the art. Examples of methylene acceptor resins include, but are not limited to, melamine resins (melamine-formaldehyde resins), urea resins (urea-formaldehyde resins), polycarbonate resins, phenolic thermosetting resins, epoxy resins, unsaturated polyester resins, acrylic resins, and guanamine resins, and polyurethane resins. Phenolic thermosetting resins are those that can cure under application of heat. These phenolic thermosetting resins include a wide variation of phenol resins that include not only polycondensation products from not only phenol as a raw material, but also polycondensation products formed of a phenolic compound, such as cresol and xylenol. In one embodiment, the phenolic thermoseeting resin is prepared by reacting phenol with aldehydes, such as, formaldehyde, acetaldehyde, and furfural in the presence of an acid catalyst or alkaline catalyst. Phenolic thermosetting resins can be modified by various compounds including, but not limited to cashew oil, tall oil, linseed oil, various animal and vegetable oils, unsaturated fatty acid, rosin, an alkylbenzene reins, aniline, and melamine. Examples of phenolic thermosetting resins include, but are not limited to, modified and unmodified phenolic resins, such as, simple or unmodified phenolic resins, cashew-modified phenolic resins, oil-modified phenolic resins, cresol modified phenolic resins, cashew-modified cresol resins, oil-modified cresol resins, novalak type xylenol resins, novalak type resorcinol resins and polyvinylphenol resins. These phenolic thermosetting resins can be modified with oils, such as, for example, rosin oil, tall oil, linseed oil, cashew oil, linoleic acid, oleic acid, linoleic acid, and various animal and vegetable oils.

In another embodiment of this invention, the methylene acceptor is a resole resin. Resole resins are based catalyzed phenol-formaldehyde resins having a formaldehyde to phenol ratio of greater than 1. In yet another embodiment, the methylene acceptor is a novolac resin, which is a phenol-formaldehyde resin with a formaldehyde to phenol molar ratio of less than one. The polymerization is brought to completion using acid-catalysis such as oxalic acid, hydrochloric acid or sulfonate acids. The phenol units are mainly linked by methylene and/or ether groups. Of course, phenolic resins that can be used in the present invention are not limited to those exemplified above. These phenolic resins may be used either singly or in admixture thereof in any proportions.

The amount of the methylene acceptor in the elastomeric composition may vary. The amount of the methylene acceptor in the elastomeric composition of the present invention can be at least about 0.1, 0.5, 1, 2, 3, 4, or 5 parts phr and not more than about 60, 50, 40, 30, 25, 20, or 15 phr, based on the total weight of the elastomers. In one embodiment of the invention, the amount of methylene acceptor ranges from about 0.1 to about 60 phr. Other ranges are from about 1 to about 40 phr and about 2 to about 25 phr.

The methylene donor compound is capable of reacting with the methylene acceptor. Methylene donors can be any that is known to those skilled in the art. In one embodiment of the invention, the methylene donor is a condensation product of melamine and formaldehyde, such as dimethylol melamine, trimethylol melamine, tetramethylol melamine, and hexamethylol melamine. In another embodiment of the invention, the methylene donor is a condensation produce of melamine, formaldehyde, and methanol, such as, hexakis (methoxymethyl) melamine, pentakis(methoxymethyl) methylol melamine, and hexamethylene-tetramine. Other examples of methylene donor compounds include, but are not limited to, hexamethylenetetramine, hexamethoxymethylmelamine, hexaethoxymethylmelamine, iminomethoxymethylmelamine, imino-isobutoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

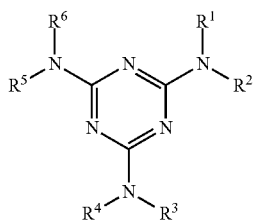

Wherein $R^1$, $R^2$, $R^3$, $R^4$, $R^5$, $R^6$ are individually selected from the group consisting of hydrogen, an alkyl having from 1 to 8 carbon atoms, and a group —$CH_2OX''$, wherein n is 1, 2, 3, 4, 5, or 6, and wherein $X''$ is individually selected from the group consisting of hydrogen, and an alkyl having from 1 to 8 carbon atoms.

Specific methylene donors include hexakis-(methoxymethyl)melamine; N,N',N''-trimethyl/N,N',N''-trimethylolmelamine; hexamethylolmelamine; N,N',N''-dimethylolmelamine; N-methylolmelamine, N,N'-dimethylolmelamine; N,N',N''-tris(methoxymethyl)melamine; and N,N',N''-tributyl-N,N',N''-trimethylol-melamine.

The amount of methylene donor that is present in the elastomeric composition may vary. The elastomeric composition of the present invention can comprise at least about 0.01, 0.05, 0.1, 0.15, 0.25, or 0.5 parts per hundred rubber ("phr") of at least one methylene donor, based on the total weight of the elastomers. Additionally or alternatively, the elastomeric composition of the present invention can comprise not more than about 10, 9, 7, 5, 3, or 2 phr of at least one methylene, based on the total weight of the elastomers. In other embodiments of the invention, the amount of methylene donor ranges from about 0.01 to about 10 phr, about 0.1 to about 5 phr and from about 0.1 to about 3 phr. The methylene donor can be used singly or in combination of two or more.

In certain embodiments, the elastomeric composition of the present invention can comprise one or more fillers. The fillers can comprise any filler that can improve the thermophysical properties of the elastomeric composition (e.g., modulus, strength, and expansion coefficient). For example, the fillers can comprise silica, carbon black, clay, alumina, talc, mica, discontinuous fibers including cellulose fibers and glass fibers, aluminum silicate, aluminum trihydrate, barites, feldspar, nepheline, antimony oxide, calcium carbonate, kaolin, and combinations thereof. In one embodiment, the fillers comprise an inorganic and nonpolymeric material. In another embodiment, the fillers comprise silica and/or carbon black. In yet another embodiment, the fillers comprise silica.

In certain embodiments, the elastomeric composition can comprise at least about 5, 10, 15, 20, 25, 30, 35, 40, 45, or 50 phr of one or more fillers, based on the total weight of the elastomers. Additionally or alternatively, the elastomeric composition can comprise not more than about 150, 140, 130, 120, 110, 100, 90, 80, 70, or 60 phr of one or more fillers, based on the total weight of the elastomers.

In certain embodiments, the elastomeric composition is a highly-filled elastomeric composition. As used herein, a "highly-filled" elastomeric composition comprises at least about 60 phr of one or more fillers, based on the total weight of the elastomers. In one embodiment, a highly-filled elastomeric composition comprises at least about 65, 70, 75, 80, 85, 90, or 95 phr of one or more fillers, based on the total weight of the elastomers. Additionally or alternatively, the highly-filled elastomeric composition can comprise not more than about 150, 140, 130, 120, 110, or 100 phr of one or more fillers, based on the total weight of the elastomers.

In certain embodiments, the elastomeric composition is not highly-filled and contains minor amounts of filler. In such an embodiment, the elastomeric composition can comprise at least about 5, 10, or 15 phr and/or not more than about 60, 50, or 40 phr of one or more fillers, based on the total weight of the elastomers.

The elastomeric composition of the present invention can comprise one or more additives. In certain embodiments, the elastomeric composition can comprise at least about 1, 2, 5, 10, or 15 phr of one or more additives, based on the total weight of the elastomers. Additionally or alternatively, the elastomeric composition can comprise not more than about 70, 50, 40, 30, or 20 phr of one or more additives, based on the total weight of the elastomers.

The additives can comprise, for example, processing aids, carrier elastomers, tackifiers, lubricants, oils, waxes, surfactants, stabilizers, UV absorbers/inhibitors, pigments, antioxidants, extenders, reactive coupling agents, and/or branchers. In one embodiment, the additives comprise one or more cellulose ethers, starches, and/or derivatives thereof. In such an embodiment, the cellulose ethers, starches and/or derivatives thereof can include, for example, amylose, acetoxypropyl cellulose, amylose triacetate, amylose tributyrate, amylose tricabanilate, amylose tripropionate, carboxymethyl amylose, ethyl cellulose, ethyl hydroxyethyl cellulose, hydroxyethyl cellulose, methyl cellulose, sodium carboxymethyl cellulose, and sodium cellulose xanthanate.

In one embodiment, the additives comprise a non-cellulose ester processing aid. The non-cellulose ester processing aid can comprise, for example, a processing oil, starch, starch derivatives, and/or water. In such an embodiment, the elastomeric composition can comprise less than about 10, 5, 3, or 1 phr of the non-cellulose ester processing aid, based on the total weight of the elastomers. Additionally or alternatively, the elastomeric composition can exhibit a weight ratio of cellulose ester to non-cellulose ester processing aid of at least about 0.5:1, 1:1, 2:1, 3:1, 4:1, 5:1, 8:1, or 10:1.

In another embodiment, the elastomeric composition can comprise a starch and/or its derivatives. In such an embodiment, the elastomeric composition can comprise less than 10, 5, 3, or 1 phr of starch and its derivatives, based on the total weight of the elastomers. Additionally or alternatively, the elastomeric composition can exhibit a weight ratio of cellulose ester to starch of at least about 0.5:1, 1:1, 2:1, 3:1, 4:1, 5:1, 8:1, 10:1, 15:1, or 20:1. In other embodiments of this invention, there is an absence of starch in the elastomeric composition.

The rubber compositions of this invention can be formulated in any conventional manner. Additionally, at least one other common additive can be added to the rubber compositions of this invention, if desired or necessary, in a suitable amount. CEA can be added in any stage of mixing. Either CEA and/or methylene acceptor(s) and/or methylene donor (s) could be master-batched with at least one elastomer before staged mixing. CEA and methylene acceptor can also be master-batched before staged mixing.

The preparation of the compositions according to the present invention may be carried out by mixing the polymer components with the possibly present reinforcing filler and the other additives according to techniques known in the art. Mixing may be carried out for instance by means of an open-mill type mixer, or by means of an internal mixer of the type with tangential (Banbury) or interpenetrating (Intermix) rotors, or in continuous mixers of the Ko-Kneader (Buss) type, or of twin-screw co-rotating or counter-rotating type. Also, any of the fillers and additives may be pre-mixed into a carrier elastomer base to make a concentrated batch and then mixed with the final formulation. The mixing and addition sequences for the components can vary. Multiple batch mixing stages can be utilized with portions of the formulation added at each stage. The mixing temperatures can vary up to 250° C. under conditions of shear sufficient to allow for adequate mixing and dispersion of the formulation components.

The elastomeric compositions according to the present invention may be vulcanized according to known techniques, and in particular with sulfur-based vulcanizing systems commonly employed for diene elastomers. To this end, after the first few thermal-mechanical working (mixing) steps, a sulfur-based vulcanizing agent is incorporated in the composition together with vulcanization activators and accelerators. In this working step, the temperature is generally kept below 125° C., to prevent undesired pre-cross-linking phenomena.

The elastomeric compositions of the present invention can be incorporated into various types of end products. In certain embodiments, elastomeric composition is formed into a tire and/or a tire component. The tire component can comprise, for example, tire tread, subtread, undertread, body plies, belts, overlay cap plies, belt wedges, shoulder inserts, tire apex, tire sidewalls, bead fillers, and any other tire component that contains an elastomer. In one embodiment, the elastomeric composition is formed into tire tread, tire sidewalls, and/or bead fillers/apex.

In certain embodiments, the elastomeric composition is incorporated into non-tire applications. Non-tire applications include, for example, a blow-out preventers, hoses, weather stripping, belts, injection molded parts, footwear, pharmaceutical closures, plant lining, flooring, power cables, gaskets, seals, rubber rollers, and architectural trims. In particular, the elastomeric compositions can be utilized in various oil field applications such as, for example, blowout preventers, pump pistons, well head seals, valve seals, drilling hoses, pump stators, drill pipe protectors, down-hole packers, inflatable packers, drill motors, O-Rings, cable jackets, pressure accumulators, swab cups, and bonded seals.

As a viscosity modifier, CEA can be used to replace liquid rubbers, fatty acid (and other) processing aids, and oils, without the negative impact on cured rubber properties. Because of the good cured stiffness and tear resistance it builds, CEA can also be used as a partial replacement for phenolic resins and fillers without deteriorating stress softening, fatigue and hysteresis.

EXAMPLES

Test Methods:

Several tests were conducted on the elastomeric compositions produced in these Examples. The test descriptions are as follows:

Cure Rheometer: Moving die Rheometer (MDR) was performed according to ASTM D 5289. ts2 is the time it takes for the torque of the rheometer to increase 2 units above the minimum value. tc90 is the time to reach 90% of the difference between minimum to maximum torque.

Mooney Scorch Viscosity: Was measured according to ASTM D 1646.

Hardness: Shore A hardness was measured according to ASTM D2240.

Mechanical Properties: Break stress, break strain, modulus at 100%, and 200% strains were measured as per ASTM D412. The speed of testing was 500 mm/min, and the gauge length was 63.5 mm (2.5 inch). The samples were conditioned in the lab for 40 hours at 50%+/−5% humidity and 720° F. The width of specimen was 1 inch, and length was 4.5 inch.

Hot Molded Groove Trouser Tear (at 100° C.): Molded groove trouser tear (Type CP modified trouser tear test piece with a constrained path for tear) was performed according to ASTM test method D624.

Rubber Processing Analysis (RPA): Monsanto MDR 2000E Moving Die Rheometer was used. 30° C. Strain Sweep was performed at 1 Hz until 15% strain was reached.

Example 1

Elastomeric compositions containing varying amounts of cellulose ester additive were compared to elastomeric compositions not containing any CEA. The elastomeric compositions were produced according to the formulations and parameters as shown in Table 1 and Table 2.

Table 1a lists the apex elastomeric compositions tested. The reference formulation was obtained from published open literature. Three different filler systems were applied in this study including silica and carbon black. A cellulose ester additive (CEA) was added in increasing phr in compounds from 0 to 15. Table 1b lists the sidewall and tread elastomeric compositions tested.

The elastomeric compositions were mixed in a 1.5 L Kobelco Banbury mixer with 4-wing tangential rotors. The elastomeric compositions were mixed in three mixing stages as outlined in Table 1, and described in Table 2. Various performance properties of the elastomeric compositions produced in Example 1 were tested. The properties are listed in Table 3. Cured rubber samples were prepared and vulcanized using the specified cure times.

TABLE 1

Table 1a: Apex formulations in phr.

|  | 1 | 2 | 3 | 4 | 5 |
|---|---|---|---|---|---|
| First Stage |  |  |  |  |  |
| NR (CV60)[1] | 100 | 100 | 100 | 100 | 100 |
| N330 carbon black[2] | 70 | 70 | 70 |  |  |
| Silica Ultrazil® VN3(cup1)[3] |  |  |  | 70 | 70 |
| Si-69[4] |  |  |  | 5.6 | 5.6 |
| CEA | 0 | 0 | 15 | 0 | 15 |
| Naphthenic Oil | 10 | 2.5 | 2.5 | 10 | 2.5 |
| Phenolic resin (Akrochem® P-86[5]) | 7.5 | 7.5 | 7.5 | 7.5 | 7.5 |
| Stearic Acid | 2 | 2 | 2 | 2 | 2 |
| Antidegradant-Lanxess: Vulkanox® HS/LG[6] | 1.5 | 1.5 | 1.5 | 1.5 | 1.5 |
| Total phr | 191 | 183.50 | 198.50 | 198.6 | 206.1 |
| Second Stage |  |  |  |  |  |
| First stage stock | 191 | 183.50 | 198.50 | 198.6 | 206.1 |
| Total phr | 191 | 183.50 | 198.50 | 198.6 | 206.1 |
| Final Stage |  |  |  |  |  |
| Second stage stock | 191 | 183.50 | 198.50 | 198.6 | 206.1 |
| TBBS[7] | 1.5 | 1.5 | 1.5 | 1.5 | 1.5 |
| Sulfur | 3 | 3 | 3 | 3 | 3 |
| Zinc Oxide | 3 | 3 | 3 | 3 | 3 |
| Hexa®[8] | 1 | 1 | 1 | 1 | 1 |
| Total phr | 199.5 | 192 | 207 | 206.35 | 213.85 |

[1]Natural Rubber from Akronchem Natural Rubber
[2]N330 carbon black from Columbian
[3]Ultrazil® VN3 (cup1) silica from Degussa
[4]Si-69 - sulfur-containing organosilane from Arkema

TABLE 1-continued

[5]Akrochem P86 reinforcing resin - cashew nut oil modified phenol-formaldehyde resin from Akronchem
[6]Vulkanoz® HS/LG - antidegradant from Lanxess
[7]TBBS accelerator from Harwich
[8]Hexa® methylene donor from Momentive Specialty Chemicals Table 1b: Sidewall (6-7) and tread (8-10) formulations in phr.

|  | 6 | 7 | 8 | 9 | 10 |
|---|---|---|---|---|---|
| First Stage |  |  |  |  |  |
| NR (CV60)[1] | 50 | 50 | 0 | 0 | 0 |
| Buna® CB 24(BR)[2] | 50 | 50 | 30 | 30 | 30 |
| SBR-Duradene® 738[3] |  |  | 70 | 70 | 70 |
| N330 carbon black[4] | 50 | 50 |  |  |  |
| N234 carbon black[5] |  |  | 55 | 55 | 55 |
| Santoflex ®6PPD[6] | 4 | 4 |  |  |  |
| CEA |  |  | 0 | 7.5 | 15 |
| Tudalen ®4191 Oil[7] | 10 | 10 |  |  |  |
| Tudalen ®4192 Oil[8] |  |  | 20 | 16.5 | 12.5 |
| phenolic resin (Akrochem ®P-86)[9] | 12 | 12 | 7.5 | 7.5 | 7.5 |
| Stearic Acid | 2 | 2 | 1.5 | 1.5 | 1.5 |
| Akrochem ®MPD-100[10] | 1 | 1 | 1.5 | 1.5 | 1.5 |
| Nochek ®4729 wax [11] | 1 | 1 | 0.5 | 0.5 | 0.5 |
| Zinc oxide | 3 | 3 |  |  |  |
| Total phr | 183 | 183 | 186 | 190 | 193.5 |
| Second Stage |  |  |  |  |  |
| First stage stock | 183 | 183 | 186 | 190 | 193.5 |
| CEA with 18 wt % TEGEH) | 0 | 12 |  |  |  |
| Total phr | 183 | 195 | 186 | 190 | 193.5 |
| Final Stage |  |  |  |  |  |
| Second stage stock | 183 | 195 | 186 | 190 | 193.5 |
| TBBS[12] | 1 | 1 | 1 | 1 | 1 |
| Accelator DPG[13] |  |  | 0.4 | 0.4 | 0.4 |
| Sulfur | 1.8 | 1.8 | 1.8 | 1.8 | 1.8 |
| Zinc Oxide | — | — | 3 | 3 | 3 |
| Hexa ®[14] | 1.5 | 1.5 | 1 | 1 | 1 |
| Total phr | 185.8 | 197.8 | 193.2 | 197.2 | 200.7 |

[1]Natural Rubber from Akronchem Natural Rubber
[2]Buna CB 24 - solution high-cis polybutadiene polymer from Lanxess
[3]SBR-Duradene ® 738 - styrene butadiene rubber from Firesyn
[4]N330 carbon black from Columbian
[5]N234 carbon black from Columbian
[6]6PPD - anti-oxidant from Flexsys
[7]Tudalen ® 4101 oil - treated distillate aromatic extract from H&R Group
[8]Tudalen ® 4102 oil - treated distillate aromatic extract from H&R Group
[9]Akrochem P86 reinforcing resin - cashew nut oil modified phenol-formaldehyde resin from Akronchem
[10]Akrochem MPD-100 - antioxidant from Akrochem
[11]Nocheck 4729 wax from Sovchem
[12]TBBS - accelerator from Harwich
[13]Accelator DPG - accelerator from Harwick
[14]Hexa ® methylene donor from Momentive Specialty Chemicals

TABLE 2

Apex Elastomeric Composition (Samples 1-5) and Tread Elastomeric Composition (Samples 8-10) mixing procedure for 1.5 L Banbury mixer.

| Stage 1 |  |
|---|---|
| Water temperature: 80° C. |  |
| Rotor speed: 65 rpm |  |
| 0" | Added rubber. Mixed 30 s. |
| 30" | Added CB/silica and oil. Mixed 60 s. |
| 90" | Continued mixing. Added all remaining ingredients (CEA, phenolic resin). Mixed 60 s. |

TABLE 2-continued

| | |
|---|---|
| 150" | Continued mixing. Adjusted RPM to reach and maintain 160-165° C. Mixed 150 s. |
| 300" | Dropped batch at 300 s. |

Banded on two-roll milling for 2 min (60° C., 16 to 20 rpm, 2-4 mm gap).
Cooled to room temperature before proceeding to next stage.

Stage 2

Water temperature: 80° C.
Rotor speed: 70 rpm

| | |
|---|---|
| 0" | Added half 1$^{st}$ stage rubber, then remaining rubber. Mixed 120 s. |
| 120" | Continued mixing. Adjusted RPM to reach and maintain 160-165° C. |
| 300" | Dropped batch at 300 s. |

Banded on two-roll milling for 2 min (60° C., 16 to 20 rpm, 2-4 mm gap).
Cooled to room temperature before proceeding to next stage.

Final Stage

Water temperature: 50° C.
Rotor speed: 35 rpm

| | |
|---|---|
| 0" | Added ¾ 2$^{nd}$ stage rubber, then all curatives, then remaining rubber. Mixed. |
| 90-120" | Dropped at 105-110° C. |

Banded on two-roll milling for 2 min (60° C., 16 to 20 rpm, 2-4 mm gap).
Cooled to room temperature before proceeding to next stage.

Sidewall Elastomeric Composition (Samples 6-7)
mixing procedure for 1.5 L Banbury mixer.

Stage 1

Water temperature: 80° C.
Rotor speed: 65 rpm

| | |
|---|---|
| 0" | Added rubber. Mixed 30 s. |
| 30" | Added CB and oil. Mixed 60 s. |
| 90" | Continued mixing. Added all remaining ingredients (phenolic resin). Mixed 60 s. |
| 150" | Continued mixing. Adjusted RPM to reach and maintain 160-165° C. Mixed 150 s. |
| 300" | Dropped batch at 300 s. |

Banded on two-roll milling for 2 min (60° C., 16 to 20 rpm, 2-4 mm gap).
Cooled to room temperature before proceeding to next stage.

Stage 2

Water temperature: 80° C.
Rotor speed: 70 rpm

| | |
|---|---|
| 0" | Added half 1$^{st}$ stage rubber, then all CEA, then remaining rubber. Mixed 120 s. |
| 120" | Continued mixing. Adjusted RPM to reach and maintain 160-165° C. |
| 300" | Dropped batch at 300 s. |

Banded on two-roll milling for 2 min (60° C., 16 to 20 rpm, 2-4 mm gap).
Cooled to room temperature before proceeding to next stage.

Final Stage

Water temperature: 50° C.
Rotor speed: 35 rpm

| | |
|---|---|
| 0" | Added ¾ 2$^{nd}$ stage rubber, then all curatives, then remaining rubber. Mixed. |
| 90-120" | Dropped at 105-110° C. |

Banded on two-roll milling for 2 min (60° C., 16 to 20 rpm, 2-4 mm gap).
Cooled to room temperature before proceeding to next stage.

TABLE 3

Table 3a: Summary of test data for apex formulations from Table 1a.

| | | Sample #: | | | | |
|---|---|---|---|---|---|---|
| | | 1 | 2 | 3 | 4 | 5 |
| | | | | CEA (phr): | | |
| | | 0 | 0 | 15 | 0 | 15 |
| | | | | Oil(phr): | | |
| | Units | 10 | 2.5 | 2.5 | 10 | 2.5 |
| MDR (160° C.) | | | | | | |
| t90 | min. | 4.85 | 4.15 | 5.44 | 2.86 | 3.32 |
| Mooney Scorch (125° C.) | | | | | | |
| t2 | min. | 1.11 | 1.01 | 1.03 | 6.3 | 6.1 |
| ML(1 + 4) | MU | 71.2 | 85 | 70.9 | 65.2 | 67 |

TABLE 3-continued

| Shore A Hardness (RT) | | | | | | |
|---|---|---|---|---|---|---|
| Hardness | — | 82.6 | 82.1 | 81.2 | 75.3 | 78.93 |
| Tensile (RT) | | | | | | |
| Tensile strength | MPa | 22.35 | 22.10 | 17.8 | 21.5 | 18.7 |
| Elongation at break | % | 286.30 | 225 | 214.7 | 377.6 | 320 |
| M100 | MPa | 7.90 | 9.93 | 9.58 | 5.71 | 6.69 |
| M200 | MPa | 16.766 | 20.37 | 17.03 | 12.77 | 13.42 |
| Trouser Tear (RT) | | | | | | |
| Ave. Force | N | 28.43 | 24.71 | 34.71 | 32.99 | 24.95 |
| Trouser Tear (100° C.) | | | | | | |
| Ave. Force | N | 14.80 | 8.51 | 11.38 | 12.96 | 14.53 |
| RPA Strain Sweep (30° C.) | | | | | | |
| G' @ 5% | kPa | 7415 | 8642 | 10354 | 5837 | 6785 |
| tanδ @ 5% | — | 0.18 | 0.197 | 0.198 | 0.139 | 0.134 |

Table 3b: Summary of test data for sidewall and tread formulations from table 1b.

| | | Sample #: | | | | |
|---|---|---|---|---|---|---|
| | | 6 | 7 | 8 | 9 | 10 |
| | | CEA (phr): | | | | |
| | | 0 | 12 | 0 | 7.5 | 15 |
| | | Oil(phr): | | | | |
| | Units | 10 | 10 | 20 | 16.5 | 12.5 |
| MDR (160° C.) | | | | | | |
| t90 | min. | 5.23 | 6.86 | 11.96 | 10.23 | 13.77 |
| Mooney Scorch (130° C.) | | | | | | |
| t2 | min. | 5.7 | 8.1 | 17.6 | 14.5 | 11.1 |
| ML(1 + 4) | MU | 41.9 | 36.8 | 37.1 | 40.3 | 41.5 |
| Shore A Stiffness (RT) | | | | | | |
| Stiffness | — | 68 | 73 | 60.4 | 65 | 67.5 |
| Tensile (RT) | | | | | | |
| Tensile strength | MPa | 17.21 | 15.83 | 12.02 | 12.15 | 11.55 |
| Elongation at break | % | 437 | 416 | 425.16 | 376.14 | 329.3 |
| M100 | MPa | 3.09 | 3.66 | 1.84 | 2.418 | 3.08 |
| M200 | MPa | 6.44 | 7.08 | 3.74 | 5.076 | 6.406 |
| Trouser Tear (RT) | | | | | | |
| Ave. Force | N | 16.59 | 33.9 | 19.36 | 33.49 | 39.82 |
| Trouser Tear (100° C.) | | | | | | |
| Ave. Force | N | 6.49 | 28.8 | 10.19 | 12.11 | 15.02 |
| RPA Strain Sweep (30° C.) | | | | | | |
| G' @ 5% | kPa | 3419 | 4075 | 2776 | 3448 | 3995 |
| tanδ @ 5% | — | 0.15 | 0.16 | 0.166 | 0.178 | 0.187 |

The data in Tables 3a and 3b demonstrated some desirable properties which were obtained by practicing the present invention. The CEA was used in two ways to improve elastomeric formulations as an additive to the formulation or as a replacement or partial replacement for oil. With 15 phr of CEA in Sample 3, the apex formulation showed an increase in G' @5%, room temperature and 100° C. trouser tear resistance with a significant drop on 130° C. Mooney viscosity when compared to Sample 2. The improved stiffness (evidenced by G' @5%) is especially beneficial for formulations such as for apex as it provides high steering stability given the apex's role of transmitting a driving force from the rim to the tire during driving and holding the load on the tire. The decreased viscosity from 85 MU to 70.9 MU suggests CEA can be used as processing aid to improve extrudability and productivity. For instance, one or more mixing stages could be eliminated. The improved tear resistance is beneficial to cut, chip and chunk resistance. Similar findings (increase in G', room temperature and 100° C. tear resistance with a significant drop on Mooney scorch viscosity) was also found for sidewall formulations when 12 phr of CEA was added with the methylene acceptor containing formulations in stage two (Samples 6-7).

When part of the oil was replaced while adding CEA, viscosity of the formulations remained constant, and there was an additional increase of G' because of the oil removal. These effects (additional increase in G' and constant viscosity) were also found for apex formulations with silica as the main filler (sample 4-5) and tread formulations (8-10).

That which is claimed is:

1. An elastomeric composition comprising at least one elastomer, at least one cellulose ester additive, at least one methylene acceptor, at least one methylene donor, and optionally, at least one filler; wherein said cellulose ester additive comprises at least one cellulose ester; and wherein said cellulose ester additive is not cellulose acetate.

2. The elastomeric composition according to claim 1 wherein said cellulose ester additive further comprises at least one plasticizer.

3. The elastomeric composition according to claim 1 wherein said cellulose ester additive further comprises at least one compatibilizer.

4. The elastomeric composition according to claim 1 wherein said cellulose ester additive further comprises at least one plasticizer and at least on compatibilizer.

5. The elastomeric composition according to claim 1 wherein said elastomer is selected from the group consisting of polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, butyl rubber, halogenated butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene).

6. The elastomeric composition according to claim 1 wherein said elastomer is a non-polar elastomer.

7. The elastomeric composition according to claim 1 wherein said elastomer is a non-nitrile elastomer.

8. The elastomeric composition according to claim 1 wherein said cellulose ester additive in said elastomeric composition ranges from about 0.5 to about 40 phr.

9. The elastomeric composition according to claim 2 wherein said plasticizer is at least one selected from the group consisting of a phosphate plasticizer, benzoate plasticizer, adipate plasticizer, a phthalate plasticizer, a glycolic acid ester, a citric acid ester plasticizer and a hydroxyl-functional plasticizer.

10. The elastomeric composition according to claim 1 wherein said compatibilizer is selected from the group consisting of ethoxylated alcohols, ethoxylated alkylphenols, ethoxylated fatty acids, block polymers of propylene oxide and ethylene oxide, polyglycerol esters, polysaccharide esters, and sorbitan esters.

11. The elastomeric composition according to claim 1 wherein said methylene acceptor is at least one selected from the group consisting of melamine resins urea, polycarbonate resins, phenolic thermosetting resins, epoxy resins, unsaturated polyester resins, acrylic resins, guanamine resins, and polyurethane resins.

12. The elastomeric composition according to claim 11 wherein said phenolic thermosetting resin is at least one selected from the group consisting of modified and unmodified phenolic resins, cashew-modified phenolic resins, oil-modified phenolic resins, cresol modified phenolic resins, cashew-modified cresol resins, oil-modified cresol resins, novolac xylenol resin, novolac resorcinol resins, and polyvinylphenol resins.

13. The elastomeric composition according to claim 1 wherein said methylene acceptor is a resole resin or novolac resin.

14. The elastomeric composition according to claim 1 wherein the amount of said methylene acceptor ranges from about 0.1 to about 50 phr, based on the total weight of said elastomers.

15. The elastomeric composition according to claim 1 wherein the amount of said methylene acceptor ranges from about 2 to about 25 phr, based on the total weight of said elastomers.

16. The elastomeric composition according to claim 1 wherein said methylene donor is a condensation product of melamine and formaldehyde or a condensation produce of melamine, formaldehyde, and methanol.

17. The elastomeric composition according to claim 1 wherein said methylene donor is at least one selected from the group consisting of hexamethylenetetramine, hexamethoxymethylmelamine, hexaethoxymethylmelamine, iminomethoxymethylmelamine, imino-isobutoxymethylmelamine, lauryloxymethylpyridinium chloride, ethoxymethylpyridinium chloride, trioxan hexamethoxymethylmelamine, and polymers of formaldehyde.

18. The elastomeric composition of claim 1 wherein the amount of said methylene donor ranges from about 0.01 to about 10 phr, based on the total weight of said elastomers.

19. An article comprising said elastomeric composition of claim 1.

20. The article according to claim 19 wherein said article is selected from the group consisting of tire components, blow-out preventers, hoses, weather stripping, belts, injection molded parts, footwear, pharmaceutical closures, plant lining, flooring, power cables, gaskets, seals, rubber rollers, architectural trims, pump pistons, well head seals, valve seals, drilling hoses, pump stators, drill pipe protectors, down-hole packers, inflatable packers, drill motors, o-rings, cable jackets, pressure accumulators, swab cups, and bonded seals.

* * * * *